A. E. PAIGE.
SPRING WHEEL.
APPLICATION FILED JULY 31, 1915.
1,376,726.
Patented May 3, 1921.
3 SHEETS—SHEET 1.
FIG. I.
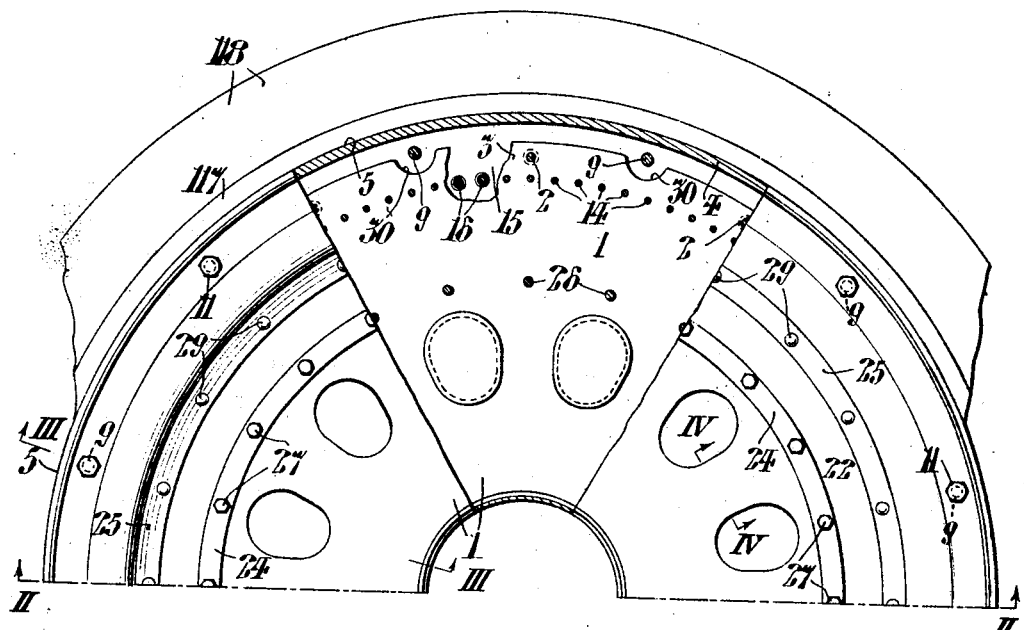
FIG. II.
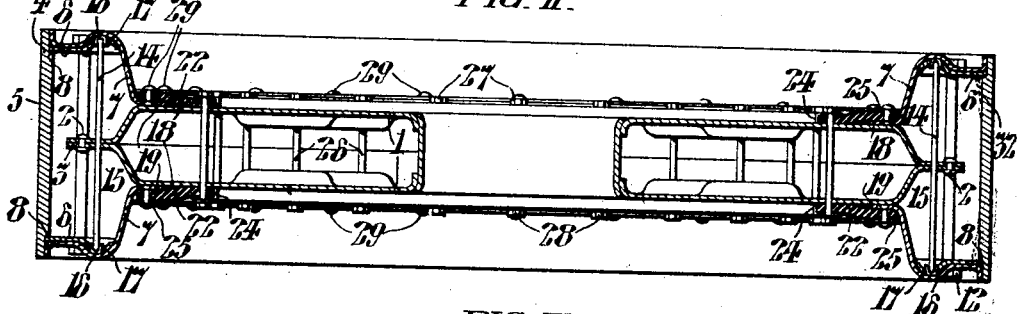
FIG. III.
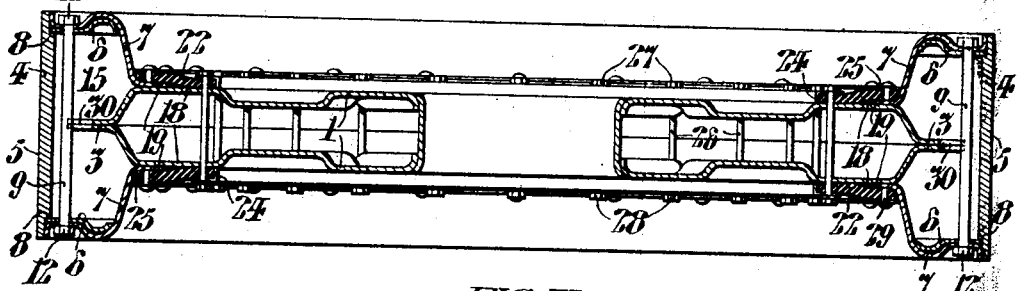
FIG. IV.
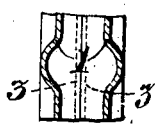
WITNESSES
Frank E. Paige.
Philip W. Vessey.
INVENTOR:
Arthur E. Paige

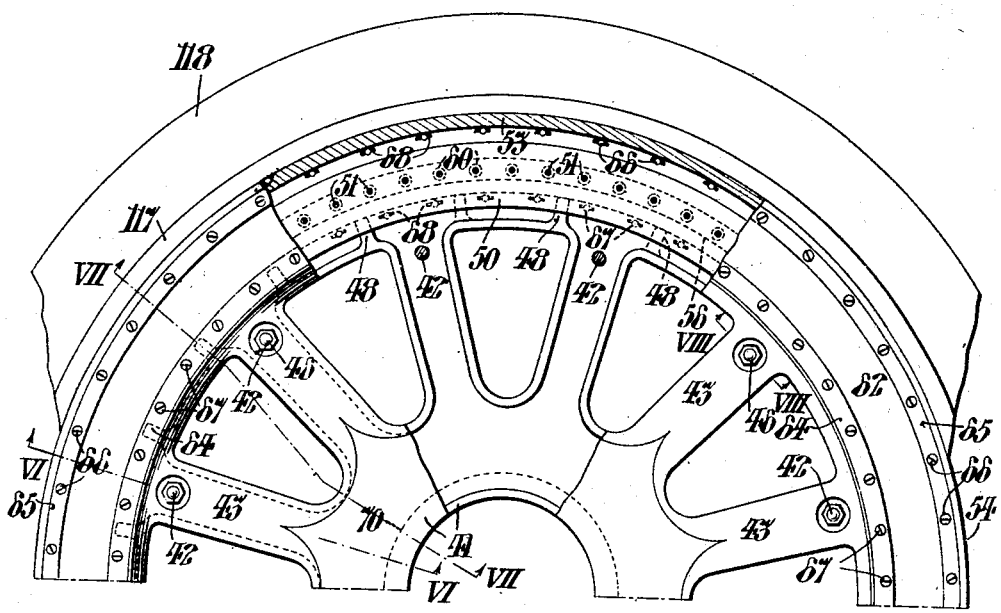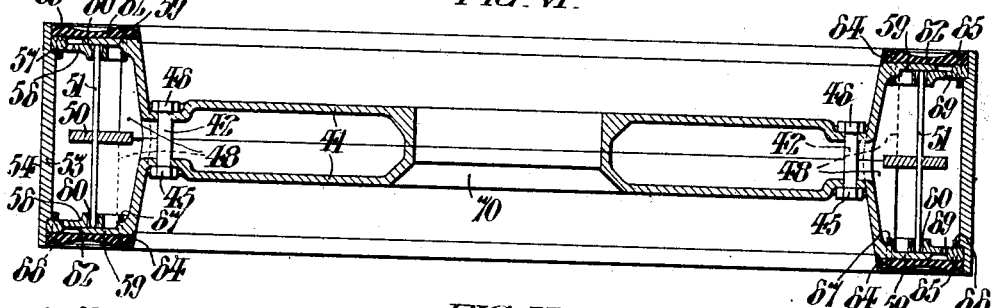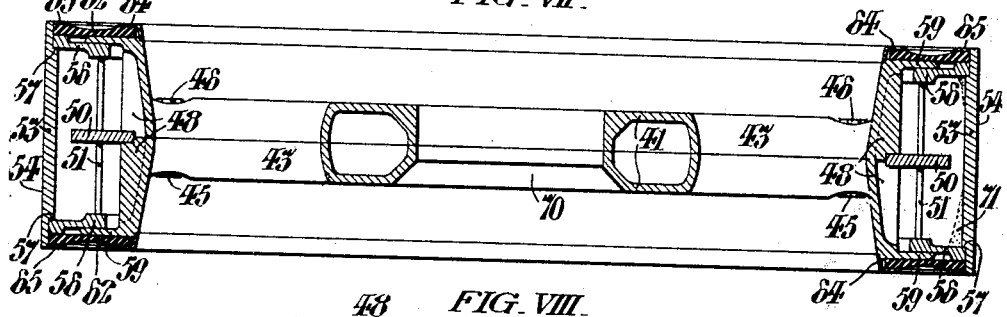

A. E. PAIGE.
SPRING WHEEL.
APPLICATION FILED JULY 31, 1915.
1,376,726.
Patented May 3, 1921.
3 SHEETS—SHEET 3.
FIG. IX.
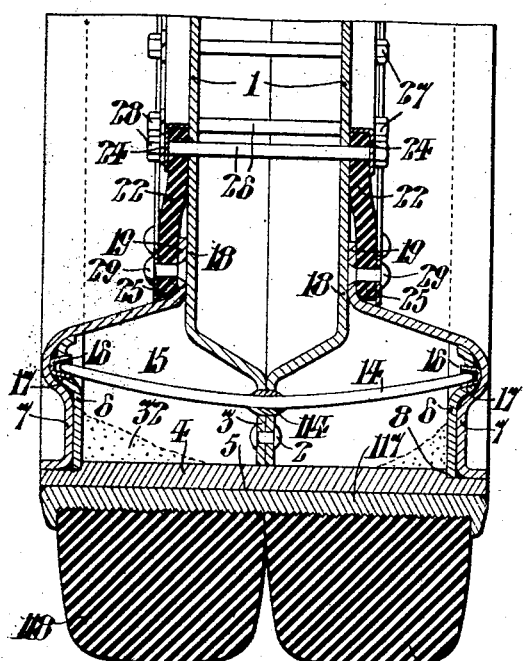
FIG. X.
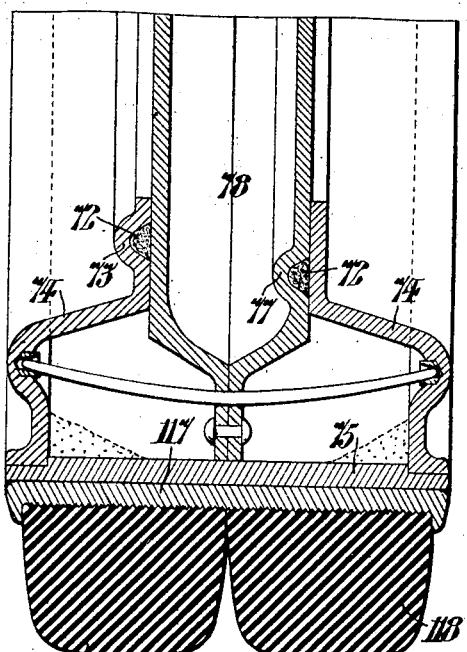
FIG. XI.
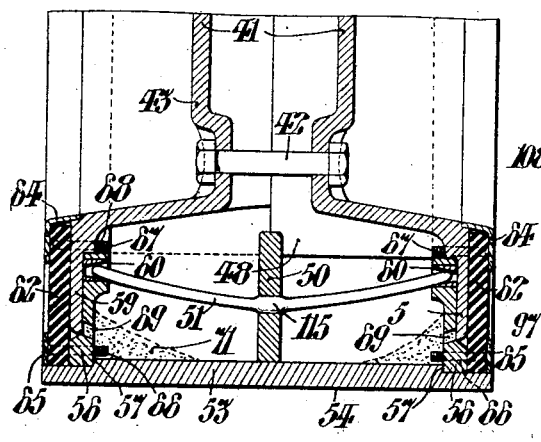
FIG. XII.
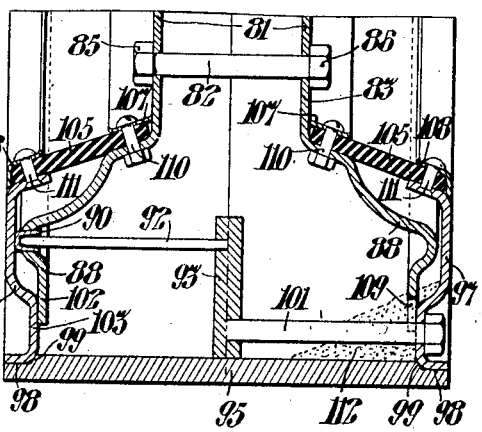
WITNESSES:
Frank E. Paige
Philip W. Kessey
INVENTOR:
Arthur E. Paige

UNITED STATES PATENT OFFICE.

ARTHUR E. PAIGE, OF PHILADELPHIA, PENNSYLVANIA.

SPRING-WHEEL.

1,376,726.  Specification of Letters Patent.  Patented May 3, 1921.

Application filed July 31, 1915. Serial No. 42,882.

*To all whom it may concern:*

Be it known that I, ARTHUR E. PAIGE, a citizen of the United States, residing at Philadelphia, in the State of Pennsylvania, have invented a certain new and useful Improvement in Spring-Wheels, whereof the following is a specification, reference being had to the accompanying drawings.

My invention provides a wheel wherein the wheel center, hereinafter termed the hub member, is connected with the wheel rim, hereinafter termed the rim member, by a circumferential series of springs, each of circular cross section throughout its length, but preferably of larger diameter at its middle than at its ends; the axis of each spring being normally straight and extending parallel with the wheel axis; so that said hub member floats on said springs, each of which always bears a portion of the load.

As hereinafter described, said hub and rim members are spaced to form an annular chamber between them inclosing said springs which are preferably tightly held in either the hub member or the rim member, at their middles, and loosely held in the other member at their ends; two pairs of contiguous, plane slide bearing members respectively carried by said hub and rim members, extend transversely to said wheel axis and prevent axial displacement of said member relatively to each other; and flexible packing members, extending between said hub and rim members, are arranged to bridge and seal the joints between said bearing members so as to exclude dust and water, and prevent the escape of a lubricant with which said chamber is charged.

My invention includes the various novel features of construction and arrangement hereinafter more definitely specified.

In the drawings:—Figure I is a fragmentary and partly sectional elevation of a wheel embodying my invention, wherein the spring members are tightly held in the hub member and loosely held in the rim member.

Fig. II is a diametrical sectional view of said wheel, taken on the line II, II in Fig. I.

Fig. III is a diametrical sectional view of said wheel, taken on the plane of the radial line III, III in Fig. I.

Fig. IV is a cross sectional view of one of the spokes of said wheel, taken on the line IV, IV in Fig. I.

Fig. V is a fragmentary and partly sectional elevation of a wheel, similar to Fig. I, but showing a modified form of my invention.

Fig. VI is a diametrical sectional view of the wheel shown in Fig. V, taken on the plane of the radial line VI, VI in Fig. V.

Fig. VII is a diametrical sectional view of the wheel shown in Fig. V, taken on the plane of the radial line VII, VII in Fig. V.

Fig. VIII is a cross sectional view of one of the spokes shown in Fig. V, taken on the line VIII, VIII.

Fig. IX is a fragmentary radial sectional view of the wheel shown in Fig. I, showing the position of the parts when the wheel is overloaded.

Fig. X is a fragmentary radial sectional view of a wheel, similar to that shown in Fig. IX, but showing a simplified construction and arrangement.

Fig. XI is a fragmentary radial sectional view, similar to Fig. IX, but showing the form of my invention, illustrated in Figs. V to VIII inclusive.

Fig. XII is a fragmentary radial sectional view of a wheel wherein the spring members are tightly held in the rim members at their middles and loosely held in the hub member at their ends. The left half of this view is similar to Fig. II in that section is taken in radial line with diametrically opposite springs. The right half of this view is similar to Fig. III, in that section is taken radially between the springs and in alinement with diametrically opposite bolts which hold the members of the rim together.

Referring to Figs. I to IV inclusive and IX, the hub member comprises opposite counterpart pressed sheet metal parts 1, conveniently connected by an axial tube with flanged ends, fitted to receive a suitable hub, and by the circumferential series of rivets 2 extending through their contiguous circumferential flanges 3. The rim member includes the felly 4, conveniently formed of a rolled steel tube, having a cylindrical perimetral face 5 parallel with the wheel axis and coextensive with the width of the wheel. Said felly has internal cylindrical rabbets, at its opposite edges, in which are tightly fitted separable circumferential metallic flanges, each comprising an internal ring 6, and an external ring 7 resiliently bearing upon the radially inner edge thereof; so that said rings 6 are held against the circumferential shoulders 8 in said rabbets, by the circumferential series of bolts 9, extending through both pairs of said rings and having heads 11 and nuts 12 axially exterior to said rings 7. Said bolts are radially exterior to the circumferential series of metallic springs 14 which extend, normally straight and parallel with the wheel axis, in the annular chamber 15 formed between said hub and rim members, and resiliently connect them. Said springs are, preferably, round to permit their universal radial flexure, convexly fusiform to equalize their fiber stresses, and obtusely pointed to facilitate their assembly, and are held at their middles in both circumferential flanges 3 of said hub member, preferably tightly, but are held loosely in said rim member at their ends, which are seated in conical bushings 16 tightly fitted in sockets 17 in the rim flange rings 6. The two pairs of contiguous plane slide bearings 18 and 19, termed metallic members, are respectively carried by said hub and rim members, extending transversely to the wheel axis at axially opposite sides of the wheel, and the two resilient packing members 22, extending between said hub and rim members, bridge and seal the joints between said bearing members. Said packing members are normally plane annular flexible resilient rubber rings having means securing their radially opposite edges to said hub and rim members, preferably including respective metallic bands 24 and 25, at said edges. The circumferential series of bolts 26 extend continuously through said hub and packing members and the axially opposite bands 24 and have heads 27 and nuts 28 exterior thereto. The rivets 29 extending through said packing members and bands 25, respectively connect them with said flange rings 7 of the rim member.

The construction and arrangement above described, is such that each of said springs 14 always bears a portion of the load carried by said hub member and is free to flex in any direction, the direction of flexure being constantly changed as the wheel turns. Said springs are so proportioned as to be flexed to a given extent under the maximum load for which the wheel is designed, but are capable of being flexed twice that much, without being permanently distorted, when the wheel is overloaded. In order to insure that said springs shall not be flexed beyond the range for which they are designed, the coupled flanges 3 on the hub member, are in such spaced relation with the felly 4 that, when the wheel is overloaded, said flanges bear upon said felly as shown in Fig. IX and thus not only limit the relative movement of said hub and rim members but afford a solid bearing between them. Moreover, in order to prevent relative torsional movement of said hub and rim members, (incident to the driving of the wheel in connection with a motor), from flexing said springs beyond the predetermined limit aforesaid, I provide said flange 3 with notches 30 the opposite edges of which are adapted to encounter said bolts 9 and thus limit such torsional movement. However, it is to be understood that neither of said stop devices comes into use during the normal operation of the wheel but said hub member floats freely upon said springs, in connection with the rim member.

In order to minimize the friction of rubbing contact of the various members above described, I prefer to include in each wheel a quantity of loose flake graphite 32 which is, of course, distributed throughout the interior space in the wheel as the latter turns.

The construction and arrangement above described, is such as to adapt the rings 6 and 7 to be formed of pressed sheet metal; and the radially inner edges of said rings 6 bear resiliently upon the rings 7, so as to brace the latter against the tension of the bolts 9 by which said bearing members 19 are held in sliding engagement with said bearing members 18. However, it is to be understood that such axially opposed and axially separable flange members may be respectively made of single pieces: for instance of cast metal as shown in Fig. X.

In the form of my invention shown in Figs. I to IV inclusive, the axially separable members of the wheel are held together by the bolts 9 which are radially exterior to the springs 14, and carried by the rim. However, such connecting means is dispensed with in the form of my invention shown in Figs. V to VIII inclusive, wherein the axially separable members of the wheel are held together by bolts carried by the hub member.

In the form of my invention shown in Figs. V to VIII inclusive; the hub member comprises opposite counterpart castings 41 connected by a circumferential series of bolts 42 extending through the spokes 43, of said hub member, and having heads 45 and nuts 46 respectively exterior thereto. Said hub members 41 have internal radial flanges 48, presented, in staggered relation, upon respectively opposite sides of each spoke member 43 as indicated in Fig. V by the full and dotted lines, and clamping between them the circumferential flange ring 50 which is thus held in rigid relation as a part of said hub member, which, preferably tightly, holds the circumferential series of spring members 51 at their middles. The rim member includes the felly 53, conveniently formed of a rolled steel tube, having a cylindrical perimetral face 54 parallel with the wheel axis and coextensive with the width of the wheel. Said felly has rabbets in which are tightly fitted separable circumferentially metallic flange members 56 also conveniently formed of cast metal and held against the circumferential shoulders 57 in said felly, by the outer circumferential flanges 59 on said hub member. Each of said flange members 56 has a circumferential series of sockets in which are tightly fitted bushings 60 in which the opposite ends of said spring members 51 are loosely held.

The flange elements 56 and 59 above described, constitute two pairs of contiguous, plane slide bearing metallic members respectively carried by said rim and hub members, extending transversely to said wheel axis, at axially opposite sides of the wheel, and the two annular packing members 62, which are conveniently formed of flexible resilient rubber, extend between said hub and rim members, bridging and sealing the joints between said bearing members. The radially opposite edges of said packing members 62 are respectively secured to said hub and rim members by means including the metallic bands 64 and 65, at said edges, and circumferential series of screws 66 and 67 extending through said packing members and bands and prevented from axial displacement by cotter pins 68, or nuts, engaging their inner ends.

I also prefer to inclose a quantity of loose flake graphite 71 in the wheels shown in Figs. V to VIII inclusive, and the distribution of the same to the rubbing surfaces of said bearing members 56 and 59 is facilitated by the openings 69 in the former. It may be observed that the chambers of the wheels containing graphite are hermetically sealed and that the flexible means described, bridging joints between said hub and rim members, are arranged to prevent the escape of said lubricant.

Said wheels are so constructed and arranged that when overloaded said flanges 50 on the hub member come to a bearing upon the inner face of the felly 53 as shown in Fig. XI. In this form of my invention, I find it unnecessary to provide means for limiting the torsional movement of the hub and rim members, other than the resilient packing members 62.

It may be observed that the hub members shown in Figs. I, to III inclusive have an axial bore which is the same in each of the primarily separate axially opposed counterparts of said members, whereas, the hub members shown in Figs. V, VI and VII have an axial bore which is different in the axially opposed primarily counterpart castings comprising said members, one of said castings being counter bored at 70 to fit a motor of what is known commercially as the electric hub type. It is to be understood that hub members embodying my invention may be otherwise adapted for use in connection with hubs of any suitable construction.

In both forms of my invention above described, the packing members are flexible resilient material having their radially opposite edges respectively secured to the hub and rim members. However, as shown in Fig. X, such packing members may be dispensed with and flexible resilient packing members 72 employed to bridge and seal the joints between the slide bearing members without being connected with either.

For instance, said packing members 72 may be formed of fibrous material, such as flax or hemp, holding a suitable lubricant. Said packing members 72 may be carried in annular grooves 73 of the flange members 74 which form part of the rim member including the felly 75; as shown at the left side of Fig. X; or in annular grooves 77 of the hub members 78, as shown at the right side of Fig. X.

In all of the forms of my invention above described, the hub members are provided with circumferential flanges in which the springs are held at their middles. However, wheels embodying my invention may be otherwise constructed and arranged. For instance, as shown in Fig. XII the hub member comprises opposite counterpart pressed sheet metal parts 81 connected by a circumferential series of bolts 82 extending through the spoke members 83, like the bolts 42 shown in Figs. V to VIII inclusive, except that their heads 85 and nuts 86 project exterior to said spoke members 83 instead of being seated in recesses therein. The circumferential flanges 88 on said hub member 81 each have a circumferential series of sockets in which are tightly fitted the conical bushings 90 loosely holding the opposite ends of the spring members 92. Said spring members are held at their middles in the circumferential flange 93 which is in rigid relation with the felly 95, which is part of the rim member including the axially opposed and axially separable flange members 97. Said flange members are tightly fitted in the rabbets 98 of said felly 95 against the circumferential shoulders 99 of the latter, and are secured by a circumferential series of bolts 101 having heads and nuts respectively axially exterior to said flange members. The two pairs of plane slide bearings, termed metallic members, 102 and 103 are respectively carried by said hub and rim members extending transversely to the axis of the wheel, at axially opposite sides of the wheel, and the two resilient packing members 105, extending between said hub and rim members, bridge and seal the joints between said bearing members. Said packing members are normally cylindrical tubular, resilient, rubber rings having means securing their axially opposite edges to said hub and rim members, including respective metallic bands 107 and 108, at said edges, and circumferential series of bolts 110 or rivets 111 extending through said packing members and bands, connecting them with said hub and rim members. In this form of my invention, the flexure of the springs 92 is limited by the hub flange members 88 coming in contact with the felly 95, when the wheel is overloaded; and the torsional displacement is not only opposed by the packing members 105 but limited by the opposite edges of the notches 109 in the perimeters of the hub flanges 88, coming in contact with said bolts 101. The bearing surfaces are lubricated by loose flake graphite 112, which, as indicated in Fig. XII, finds its way between the flanges 88 and 97 through said notches 109.

The springs above described are preferably convexly fusiform and more obtusely acuminate at their ends than elsewhere, to facilitate assembling them, as shown. They may be driven directly in the flanges of the hub member or tightly secured therein by swaging the margins of the openings through which they extend. However, I find it convenient to provide the springs with hardened and tempered steel sleeves 114, as shown in Fig. IX, which may be driven in the flanges of said hub member and in which the spring members may be either tight or loose. However, suitable springs may be formed of straight cut pieces of resilient wire of uniform diameter. That is to say, the spring elements of my invention may be cylindriform, or provided with reinforcements at their middle portions, either by enlargements in unitary relation therewith or by tubular elements through which they extend, either tightly or loosely. Unitary enlargements 115 such as shown in Fig. XI, may be readily formed in steel wire which is primarily of uniform diameter throughout its length, by clamping the wire in an electric welding machine, in jaws which are caused to approach each other when the wire is at the proper temperature. However, springs of the form shown in Fig. IX may be rolled or drop forged.

In all of the forms of my invention above described, the hub and rim members are spaced to form an inclosed spring chamber between them which is charged with a lubricant, preferably the dry flake graphite described, so as to automatically lubricate all of the rubbing surfaces as a consequence of the turning movement of the wheels, and the resilient packing members not only seal said chambers against ingress of dust and water but prevent the escape of said lubricant. Although I prefer to form said packing members of resilient material, as above described, they may be formed of annularly corrugated sheet metal, or of flexible material which is not resilient, the only essential being that they shall bridge and seal the joints between the hub and rim members.

It may be observed that in each of the wheels above described, the annular plane slide bearing members carried by the rim members have the relative approach of their outer edges limited by the shoulders upon the rim members, against which said plane members abut when they are drawn together by the bolts which extend through them, as best shown in Fig. III. However, said bolts are so spaced, radially with respect to said shoulders, that the latter act as fulcrums upon which said plane members are flexed, by said bolts, to precisely adjust the inner edges of said plane members to fit the hub members with respect to which they slide. It is obvious that such construction and arrangement is advantageous, not only in the primary assembling of the wheel parts aforesaid, but in effecting compensation for wear upon the sliding surfaces which is, of course, augmented by the tendency of said hub and rim members to move axially with respect to each other, under the strains imposed upon them, particularly when the vehicle is turned.

Each of the wheels above described has its outer perimeter shaped to drive fit tires of an ordinary commercial type each including a steel band 117 carrying a rubber shoe or shoes 118. However, it is to be understood that rim members constructed in accordance with my invention may be otherwise adapted to receive tires of any suitable form or construction, or may be used with the members above described as fellies, in direct contact with the surface traversed by the vehicle.

I do not desire to limit myself to the precise details of construction and arrangement herein set forth, as it is obvious that various modifications may be made therein without departing from the essential features of my invention as defined in the appended claims.

I claim:—

1. In a spring wheel, the combination with a hub member including two axially opposed concavoconvex parts having contiguous perimetral flanges extending transversely to the wheel axis; of a circumferential series of spring members parallel with the wheel axis and tightly held at their middles in said flanges; means connecting said parts, independently of said springs, including members extending through said flanges, radially exterior to said spring members; and a rim loosely holding the ends of said spring members.

2. In a spring wheel, the combination with a hub member including two axially opposed concavoconvex parts having contiguous perimetral flanges extending transversely to the wheel axis; of a circumferential series of spring members parallel with the wheel axis and tightly held at their middles in said flanges; means connecting said parts, independently of said springs, including members extending through said flanges; and a rim loosely holding the ends of said spring members.

3. In a spring wheel, the combination with a hub member including two axially opposed concavoconvex parts having contiguous perimetral flanges extending transversely to the wheel axis; of a circumferential series of spring members parallel with the wheel axis and held at their middles in said flanges; means connecting said parts, independently of said springs, including members extending through said flanges, radially exterior to said spring members; and a rim holding the ends of said spring members.

4. In a spring wheel, the combination with a hub member including two axially opposed concavoconvex parts having contiguous perimetral flanges extending transversely to the wheel axis; of a circumferential series of spring members parallel with the wheel axis and held at their middles in said flanges; means connecting said parts, independently of said springs, including members extending through said flanges; and a rim holding the ends of said spring members.

5. In a spring wheel, the combination with a hub member including two axially opposed concavoconvex parts having contiguous perimetral flanges extending transversely to the wheel axis; of a circumferential series of spring members parallel with the wheel axis and tightly held at their middles in holes in said flanges; and a rim loosely holding the ends of said spring members.

6. In a spring wheel, the combination with a hub member including two axially opposed concavoconvex parts having contiguous perimetral flanges extending transversely to the wheel axis; of a circumferential series of spring members parallel with the wheel axis and held at their middles in holes in said flanges; and a rim holding the ends of said spring members.

7. In a spring wheel, the combination with relatively movable hub and rim members; of a circumferential series of springs, parallel with the wheel axis and resiliently connecting them; said hub member including two axially opposed parts, each having a circumferential flange holding said springs, at different regions thereof, intermediate their ends.

8. In a spring wheel, the combination with relatively movable hub and rim members; of a circumferential series of springs, parallel with the wheel axis and resiliently connecting them; said hub member including two axially opposed parts, each having a circumferential flange holding said springs, at different regions thereof.

9. In a spring wheel, the combination with relatively movable hub and rim members; of a circumferential series of springs, parallel with the wheel axis and resiliently connecting them; said hub and rim members each including two axially opposed parts, each having a circumferential flange holding said springs, at different regions thereof.

10. In a vehicle wheel, the combination with a tubular felly, which is cylindrical throughout its width at its perimeter, having internal rabbets forming annular shoulders at opposite sides thereof; of a pair of axially opposed and separable flange rings fitted in said felly, and respectively abutting against said shoulders at their outer circumferences; each of said flanges being converged from its outer to its inner edge, so that the inner edges of said flanges are in closer spaced relation than the outer edges thereof; bolts connecting said flange rings, independently of said felly, maintaining them in rigid relation with said felly; a hub member, embraced between said flange rings, of smaller diameter than the inner circumference of said felly, and movable in the latter; said hub member having a central circumferential flange arranged to limit its movement in said felly by contact with the latter; annular sealing members interposed between said hub member and the respective flange rings; and a series of springs extending through said hub member, each having its ends respectively engaged with said flanges.

In testimony whereof, I have hereunto signed my name at Philadelphia, Pennsylvania, this thirtieth day of July, 1915.

ARTHUR E. PAIGE.

Witnesses:
ANNA ISRAELVITZ,
ROSANNA A. LA LANDE.